June 12, 1951 E. C. RANEY 2,556,981
SNAP ACTING CONTROL SWITCH
Filed Aug. 3, 1948 6 Sheets-Sheet 1

INVENTOR.
Estel C. Raney
BY
Warren H. F. Schmidin
ATTORNEY

June 12, 1951          E. C. RANEY          2,556,981

SNAP ACTING CONTROL SWITCH

Filed Aug. 3, 1948          6 Sheets-Sheet 2

INVENTOR.
Estel C. Raney
BY
Warren H. Schmeding
ATTORNEY

June 12, 1951  E. C. RANEY  2,556,981
SNAP ACTING CONTROL SWITCH
Filed Aug. 3, 1948  6 Sheets-Sheet 3

INVENTOR.
Estel C. Raney
BY
Warren H. F. Schmidt
ATTORNEY

June 12, 1951  E. C. RANEY  2,556,981
SNAP ACTING CONTROL SWITCH
Filed Aug. 3, 1948  6 Sheets-Sheet 4

INVENTOR
Estel C. Raney
BY
ATTORNEY

June 12, 1951     E. C. RANEY     2,556,981
SNAP ACTING CONTROL SWITCH

Filed Aug. 3, 1948     6 Sheets-Sheet 5

INVENTOR.
Estel C. Raney
BY
Warren H. F. Schmieding
ATTORNEY

June 12, 1951 E. C. RANEY 2,556,981
SNAP ACTING CONTROL SWITCH
Filed Aug. 3, 1948 6 Sheets-Sheet 6

INVENTOR
Estel C. Raney
BY
Warren H. F. Schmieding
ATTORNEY

Patented June 12, 1951

2,556,981

UNITED STATES PATENT OFFICE 2,556,981

SNAP ACTING CONTROL SWITCH

Estel C. Raney, Delaware, Ohio, assignor to Ranco Incorporated, Columbus, Ohio, a corporation of Ohio Application August 3, 1948, Serial No. 42,177

8 Claims. (Cl. 200—67)

The present invention relates to controllers such as those employing snap acting mechanisms.

One of the objects of the present invention is to provide a snap acting mechanism in which one of the elements, to be moved with a snap action, is pivotally connected to one end of a link and the other end of the link is pivotally connected to a spring, the support for the spring, and the pivotal connection of the link being arranged to have a dead center position, the link being arranged to be shifted so as to move the mechanism through its dead center position.

Another object of the present invention is to maintain pressure in one direction on the element, which is to be moved with snap action, while the mechanism is in its dead center position and until it is moved beyond said position, for example, when the snap acting mechanism is employed in an electric switch, it is an object to maintain pressure between the contacts while the mechanism is in dead center position and maintain this pressure until after the snap action is initiated.

Further objects and advantages will be apparent from the following description, reference being had to the accompanying drawings wherein preferred forms of embodiments of the invention are shown.

Figure 1:
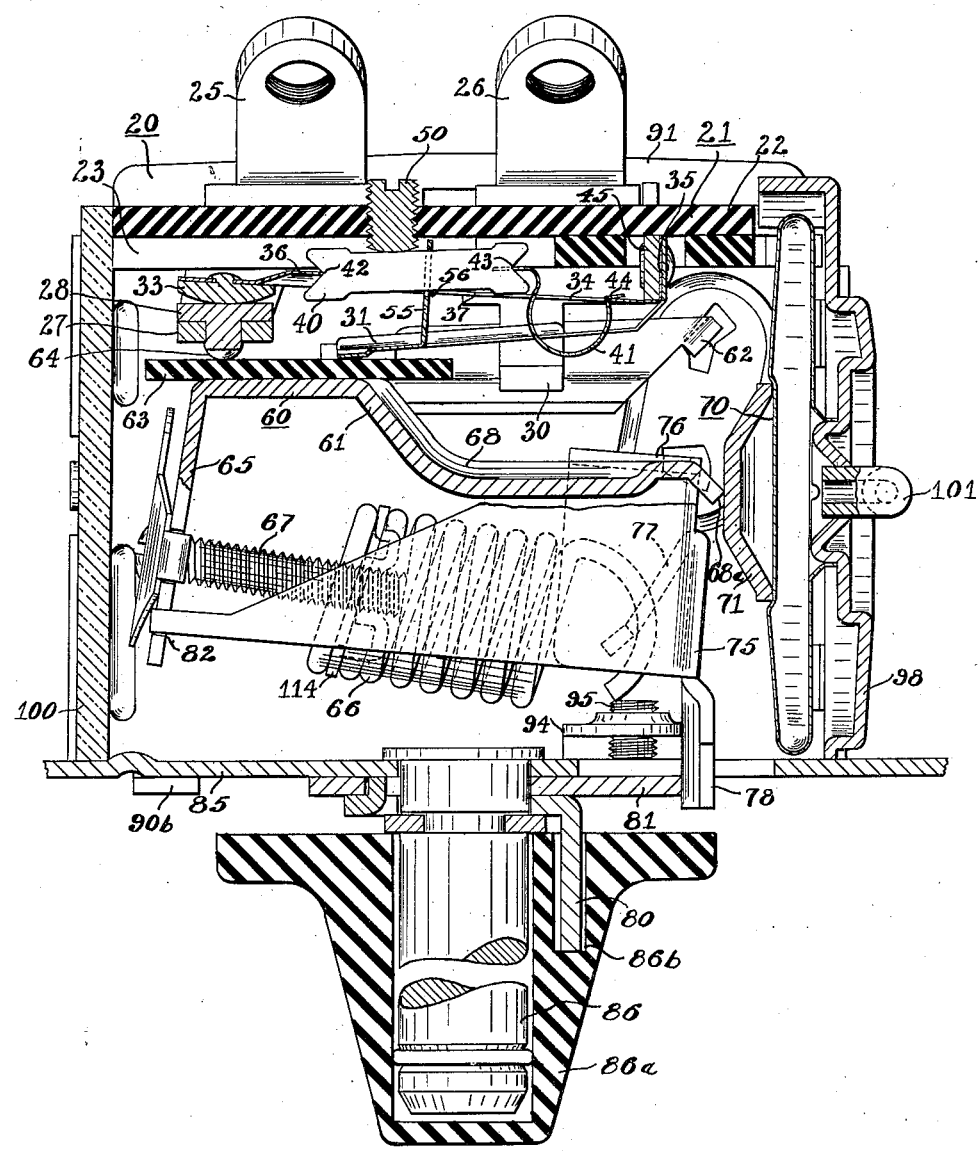
Fig. 1 is a side view, partly in section, of a switch device incorporating one form of the present invention.

Referring further to the drawings, the embodiment of the snap acting switch device shown in Fig. 1 comprises in general a housing 29 enclosing several cooperating subassemblies. The top closure member 21 is formed from an upper panel 22 and a lower panel 23 of resinous material such as phenolite. These panels are suitably attached to one another and are held in position with respect to the housing in any suitable manner.

Front and rear terminals 25 and 26 are formed of brass and extend through these panels. The front terminal 25 is formed with its lower end curved to provide a U-shaped portion 27 which serves as a seat for a stationary contact 28. The rear terminal 26 is provided with an inwardly turned arm 30 forming a lower stop for a leaf spring 31.

Figure 9:
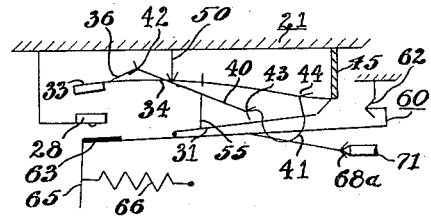
Fig. 9 is also a view similar to Fig. 7 illustrating the mechanism with the switch contacts in the open position and showing the bow of the leaf spring on an exaggerated scale.
Figure 8:
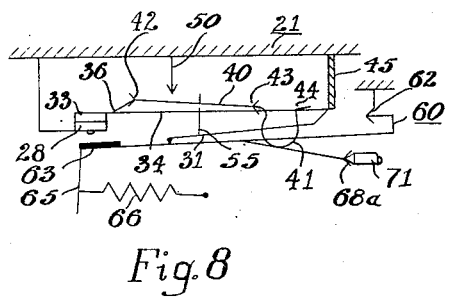
Fig. 8 is a view similar to Fig. 7 illustrating the switch contacts in the closed position and with the mechanism at the point of toggling to switch opening position.
Figure 10:
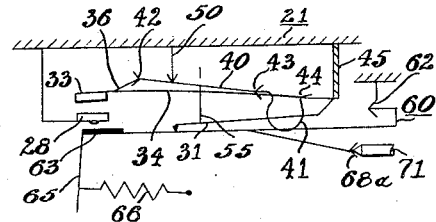
Fig. 10 is another view similar to Fig. 7 illustrating the switch contacts in the open position, but with the mechanism at the point of toggling to switch closing position.

A movable element includes a contact 33 carried by a leaf spring 34. In the preferred construction, the leaf spring is formed with an upturned end riveted, as at 35, to the under side 45 of the rear terminal 26, Fig. 1. There is thus provided a lever with a fixed fulcrum at one end which is movable in two directions to open and close the contacts 28 and 33. In this construction, as seen in Figs. 1 and 10, an off-set portion forming a projecting lip 36 is provided adjacent the free end of spring 34. In the form of construction illustrated in Figs. 11 to 14, the projecting lip 36 is omitted and the link 40 of the toggle mechanism engages directly in the body portion of spring 34. With either of these constructions, however, spring 34 is formed with a centrally located cut away portion or slot 37, Fig. 2, extending back from the lip 36, or from close to the outer end when the lip is not used, almost to the upturned end 35. The slot 37 provides clearance for the operation of the snap mechanism which is more fully described hereafter. In operation, the spring 34 is placed under tension by bowing it as illustrated in Fig. 9. When the contacts 28 and 33 are closed, but are about to be snapped open, as seen in Fig. 8, for example, the tension in spring 34 is sufficient to hold the contacts together until after the pivot points 42, 43 and 44 are moved out of alignment, i. e., dead center position by the snap mechanism.

A snap mechanism is provided for moving the spring 34 to either open or close the contacts with a snap action. This mechanism includes a toggle assembly having a link or toggle member 40 and a spring, herein shown as a flat, U-shaped spring 41, both carried by the spring 34, and provides for actuating the spring 34 in either of two directions, i. e., up or down as viewed in Fig. 1. The toggle member 40 is formed from a thin, flat piece of brass having V notches 42 and 43 provided in each end thereof. In mounting the toggle member within the slot 37 of spring 34, one of the V notches pivotally engages with the off-set lip 36, while the other end thereof similarly engages with one end of the U-shaped spring 41. The other end of the toggle spring 41 also pivotally engages within the spring 34, having an outwardly turned end portion which is received by the slot 37 and, rests against the shoulder 44 at the end of slot 37.

Figure 11:
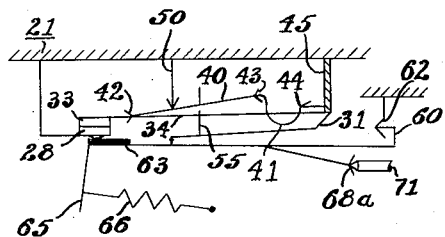
Fig. 11 is a diagrammatic view of another form of the switch mechanism with the contacts in closed position and illustrating the spring of the snap mechanism with a mounting independent of the leaf spring.
Figure 12:
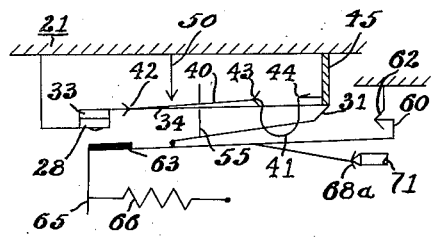
Fig. 12 is a view similar to Fig. 11 illustrating the switch contacts in the closed position and with the mechanism at the point of toggling to switch opening position.

When the construction shown in Figs. 11 to 14 is used, the toggle member or link 40 and spring 41 are also disposed within the slot 37. The offset portion 36 of leaf spring 34 is eliminated and the right end of spring 41 pivotally engages, as indicated at 44, with the supporting member 45. This provides a mounting for the end of spring 41 separate or independent of the springs 31 and 34. It will be apparent that with this construction both the spring 34 and the toggle mechanism can be adjusted separately. Furthermore, it is not necessary to bow or tension the leaf spring 34 to assure sufficient pressure being maintained between the contacts 28 and 33 when the snap mechanism is at the dead center position. Thus, for example, as seen in Fig. 12, the contacts are closed and, even though at the dead center position where they are about to toggle open, the components of force extending through the aligned pivot points, 42, 43, and 44 are directed downwardly relative to the leaf spring 34 and hold the contacts closed. Pressure is maintained between the contacts 33 and 28 by the spring 41 until the pivot point 43 of link 40 and spring 41 is moved a substantial distance beyond its dead center position with respect to pivot points 42 and 44, e. g., toward the position illustrated in Fig. 13. The force then exerted on the link 40 causes it to pivot about the fulcrum 50 and the contacts are opened with a snap action.

Figure 14:
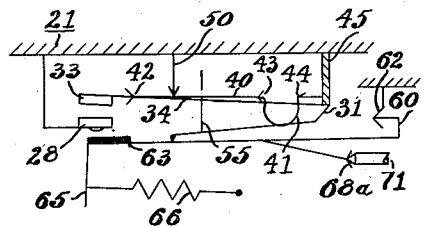
Fig. 14 is also a view similar to Fig. 11 illustrating the switch in the open position, but with the mechanism at the point of toggling to switch closing position.

Thus it will be seen that the contact 33 is pressed against contact 28 and this pressure is maintained until after the toggle is in snap action to separate the contacts. Similarly, it is to be noted that with the contacts open and at the point of toggling toward closed position, as shown in Fig. 14, when the pivot points 42, 43 and 44 are again aligned, the components of force extending through these points thus tend to maintain spring 34 under tension and prevents vibration or premature closing thereof. This condition is maintained until after further movement of the link 40, e. g., toward the position shown in Fig. 11, when the spring 34 carries through the dead center position and causes the contacts to close with a snap action.

A differential screw 50 is threadedly received within the top closure member 21. This screw extends down into the interior of the housing and is adjusted so that the lower end thereof engages the toggle member 40 between its ends to provide a fulcrum about which it moves.

The leaf spring 31 forms an actuating member for moving the toggle 40. This spring has an upturned or flanged end portion which is connected to the under side of the rear terminal 26, Fig. 1, by means of the same rivets, as shown at 35, used to fasten spring 34 in place. With this construction, spring 31 functions as a lever having a fixed fulcrum point at one end thereof. Spring 31 is also slotted out sufficiently in the central part thereof to provide clearance for the lower end of the toggle spring 41, as illustrated in Fig. 1, and to permit the free operation of the toggle member when the spring 34 moves in either direction.

Figure 2:
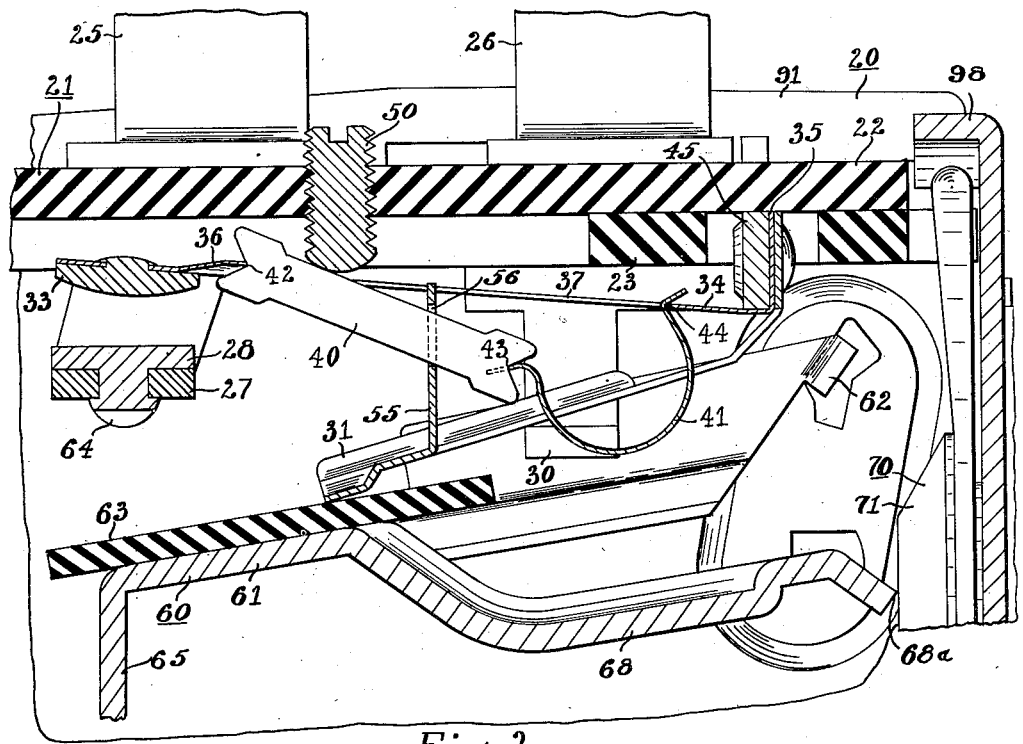
Fig. 2 is a fragmentary side view, partly in section, showing the switch contacts of Fig. 1 in the open position.
Figure 3:
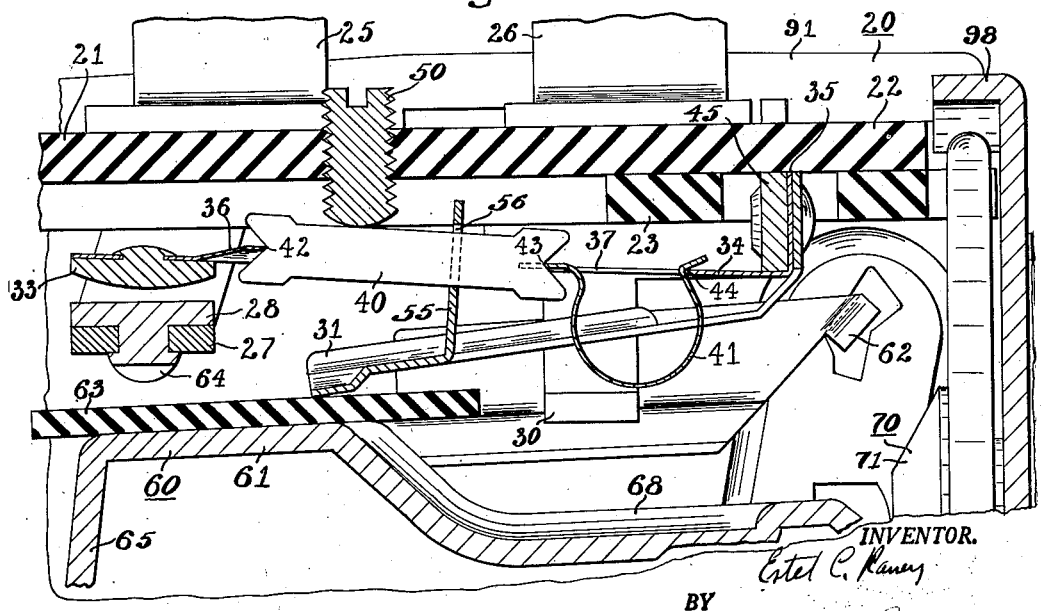
Fig. 3 is a view similar to Fig. 2 illustrating the switch contacts in the open position, but with the snap mechanism at the point of toggling while moving to close the contacts.
Figure 4:
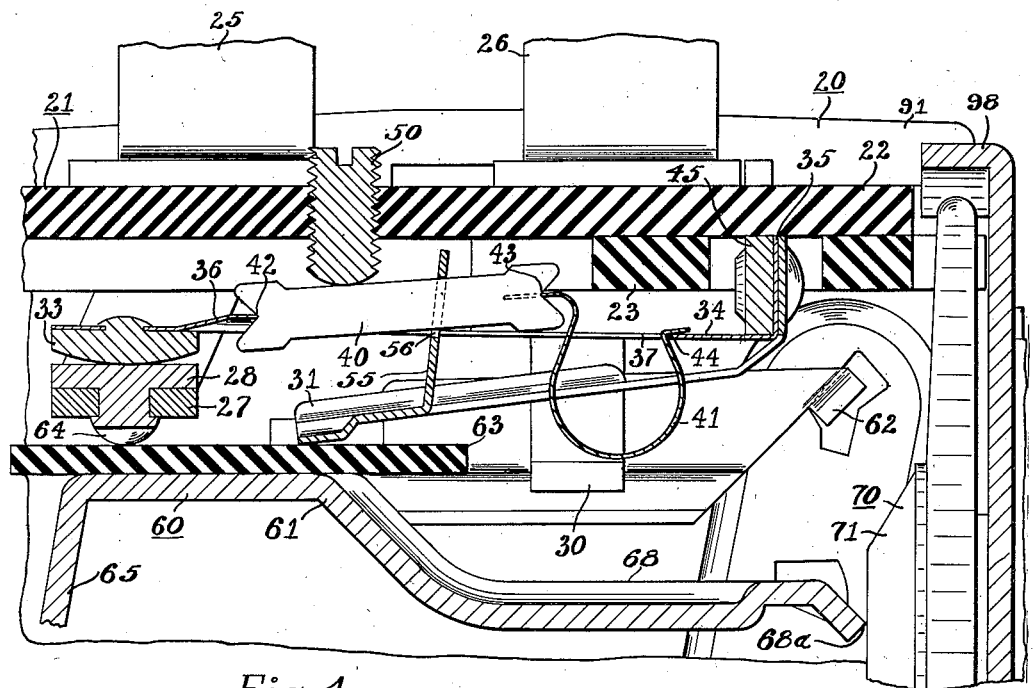
Fig. 4 is another view similar to Fig. 2 illustrating the switch contacts in the closed position.
Figure 5:
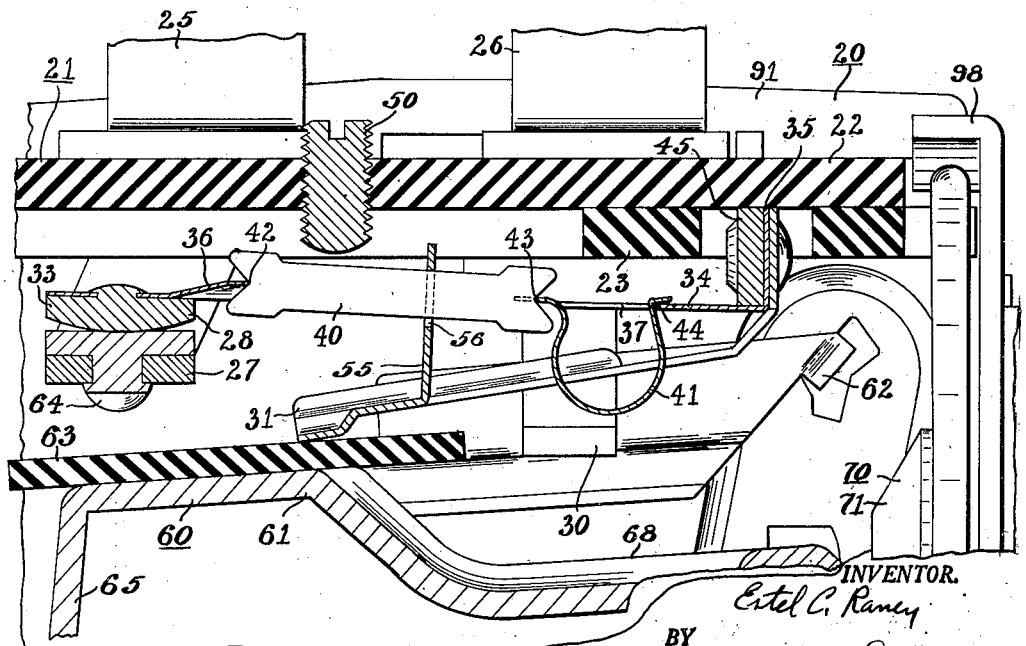
Fig. 5 is also a view similar to Fig. 2 illustrating the switch contacts in the closed position and with the snap mechanism at the point of toggling to open the contacts.
Figure 6:
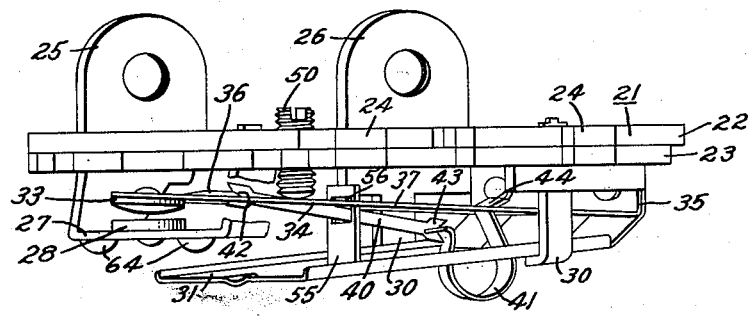
Fig. 6 is a perspective view of the snap acting switch mechanism.

Spring 31 is formed with an upwardly projecting arm 55 adjacent its free end. This arm has a slot 56, Fig. 6, formed therein adjacent the upper end thereof through which the toggle member 40 extends. By slotting the arm, shoulders are formed and these shoulders provide for engaging the toggle member 40 to translatably move the same up and down or swing the arm about the screw 50. The slot 56 provides sufficient clearance on either side for movement of the toggle member from a dead center position, wherein the pivotally connected ends of the toggle member 40 and toggle spring 41 are aligned in a substantially straight line, as illustrated in Figs. 3 and 5, to a position beyond such dead center as shown in Figs. 2 and 4. In the embodiment shown in Figs. 1 to 10, the switch spring 31 is given an initial tension which tends to hold the left end in down position, as seen in Fig. 6. Furthermore, this initial tension is sufficient to assure pressure between the contacts until the toggle and toggle spring 41 are moved beyond the dead center position shown in Fig. 3 when the snap mechanism is moving toward switch opening position.

The switch spring 31 is herein shown as being actuated in one direction by a bellows. A bellows lever assembly 60 comprises in general a lever 61 having a pair of arms formed with outwardly projecting shoulder portions 62 at their ends adapted to pivotally engage on shoulders formed by openings in the side walls of the housing 20 to pivotally mount the same. At the other end of lever 61, a flat plate of insulating material 63, such as phenolite, is attached to provide an insulator upon which the lower end of the switch spring 31 is adapted to rest. Thus upward movement of the bellows lever assembly 60 tends to raise the switch spring 31 which in turn moves the toggle member 40 as previously described. Travel limit stops 64, Fig. 6, are located on the under side of the U-shaped portion 27 to limit the upward movement of the bellows lever assembly.

Projecting downwardly from the outer or free end of lever 61 is a depending arm portion 65. A coil range spring 66, together with its adjusting screw 67, and range spring nut 114, are carried by the arm 65 as seen in Fig. 1. Also forming a part of the lever 61, is a downwardly and obliquely projecting arm 68 which is adapted to seat at its outer end 68A against a bellows or aneroid 70. A bearing block 71 is soldered to the exposed side wall of the bellows. It will be readily apparent from reference to Fig. 1 that expansion and contraction movements of the bellows 70, will be transmitted through the bellows lever 65.

To provide for adjustably controlling the movement of the bellows lever 65, the range spring 66 is connected at its inner end to a lever 75. This lever 75 is formed with outwardly projecting shoulder portions 76, Fig. 1, which pivotally engage on shoulders formed by openings in the side walls of the housing 20 so as to pivotally mount the same. The lever 75 is also formed with a central hook portion 77 through which the inner or free end of the range spring 66 engages. This lever also includes a downwardly projecting cam follower 78. A cam driver 80 is suitably secured to a cam 81 and cam 81 actuates the follower 78.

The cam 81 and cam driver 80 of the switch mechanism are carried on the under side of a mounting bracket 85 for the housing, which latter also supports the depending dial shaft 86. This shaft carries a turning knob 86a, the knob having a socket 86b for receiving the cam driver 81.

Lever 75 at its left end is arranged to engage a shoulder 82 near the bottom of arm 65 of lever 61. The tension of spring 66 can be adjusted through the cam and cam follower to regulate the resistance of the spring 66 to the bellows. Cam 81 can be rotated to such an extent that it causes the lever 75 to engage the shoulder to rotate the lever 61 in a counterclockwise direction whereby the spring 31 of the switch mechanism will be free to open the switch contacts. In this manner this switch can be opened manually.

Leaf spring 31 is biased downwardly and follows the downward movement of the plate 63 when lever 60 moves counterclockwise. The tension of spring 31 is sufficient to overbalance the toggle mechanism (link 40 and spring 41) and thereby opens the switch after plate 63 recedes to a predetermined downward position.

In addition to the top closure member 21 and the mounting bracket 85, which latter serves as a bottom closure member, the housing 20 also includes a pair of oppositely disposed steel case plates 91, Fig. 9, forming side closure members. Only the rear plate is shown. It will be understood that the front plate is similar. It is these plates that form the side walls, previously referred to and which are provided with openings for receiving the fulcrum shoulder portions 62 and 76 of levers 61 and 75, respectively, the walls defining the openings, forming bearings for the lever shoulder portions.

The side walls 91 are secured to the bottom closure or mounting bracket 85 by two screws 95 which extend through bracket 85 and are threaded into brackets 94. Each of these brackets is formed integrally with a side wall 91 by shearing parts of wall and then bending the part, intermediate the shearing, inwardly. An ear 90—b of each side wall 91 extends below the mounting bracket 85.

End walls 98 and 100 are suitably secured to opposite ends of the side walls 91. The bellows 70 is carried by end wall 98. A tube 101 extends through wall 98 and connects with the interior of bellows 70. End wall 100 may be formed of transparent material such as glass.

In operation the tube 101 of the bellows 70 can be connected to a pressure system, such as an air or steam line, or a thermostatic system commonly used in refrigeration controls. A change of pressure within the bellows 70 acts to vary its length, which variation is transmitted to the toggle assembly by the bellows arm 68. It will be apparent also that expansion of the bellows 70 is opposed by the range spring 66, which in turn is regulated by the adjustment effected through movement of the cam follower 78.

Due to the construction of the various members, a relatively high leverage ratio for the leaf spring 34 is obtained and can be utilized to eliminate any "graduating" tendency of the contacts to move at the instant before separation. There is a relatively high contact pressure maintained until the contacts are separated by the snap mechanism. Also, the movement of the free or contact end of spring 34 is relatively large compared to the movement of the bellows lever 68. Thus for a short bellows movement a wide separation of the contacts is obtained.

Figure 13:
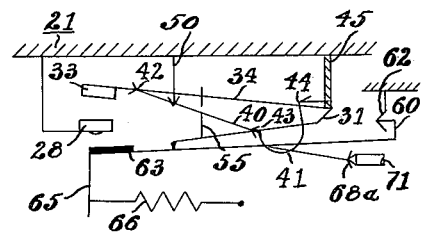
Fig. 13 is another view similar to Fig. 11 illustrating the mechanism with the switch contact in the open position.

The snap action with respect to the contacts is acquired by the action of the toggle 40 and spring 41 cooperating with the movable leaf spring 34 and the switch spring 31. In operation, the contacts are in the open position, as illustrated in Figs. 9 and 13, due to the initial tension given spring 31. In these views it will be noted that the three points 42, 43 and 44 are not aligned relative to each other, and that the maximum separation between the contacts 28 and 33 is obtained. In this position, the bellows lever arm 61 is not exerting sufficient upward pressure to overcome tension of the range spring. The force exerted by the spring 41 upon the right end of the toggle member 40 causes it to hold the left end of member in the position shown to hold the contacts in the open position.

When bellows 70 expands, due to increased pressure therein, lever arm 61 pushes switch spring 31 and arm 55 moves upwardly. When moved upwardly to the position as seen in Figs. 10 and 14, the pivot points 42, 43 and 44 are aligned in a substantially straight line with respect to each other, and although the contacts 28 and 33 are still separated, leaf spring 34 is at the point of toggling to close the same. At this point, as seen most clearly in Figs. 10 and 14, the toggle member 40 is resting on the lower edge of slot 56 in the arm 55. In this position the slot 56 also provides sufficient clearance above the toggle member to permit upward movement of the latter. Then the slightest further upward movement of the arm 55 raises the toggle member 40 and the pivot points 42 and 43 are no longer in a straight line alignment with point 44. The tension of spring 41, which has been compressed by the movement described in connection with Figs. 10 and 14, is then exerted against the right end of the toggle member causing it to pivot upwardly about the screw 50 whereby the contacts are closed with a snap action, to the position shown in Figs. 7 and 11.

Figure 7:
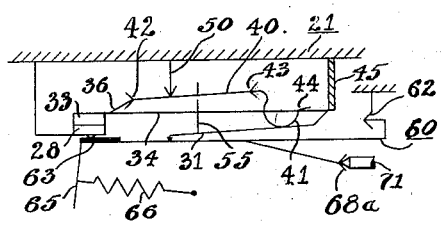
Fig. 7 is a diagrammatic view of one form of the switch mechanism with the contacts in closed position.

When the operating conditions are such that the bellows pressure decreases, range spring 66 will impart counterclockwise movement to lever arm 61 and switch spring 31 will follow the arm 65. The arm 55 of spring 31 moves downwardly till the upper edge of the slot 56 rests against the toggle member 40 as seen in Figs. 7 and 11. Any further downward movement of the arm 55, in response to further downward movement of the switch spring 31, causes the inner end of the toggle member 40 to be pulled downwardly until the pivot points 42, 43 and 44 are again substantially in straight line alignment as illustrated in Figs. 8 and 12. This movement also tends to further compress the spring 41 as previously described. It is to be noted, however, when the leaf spring 34 is in the position illustrated in Figs. 8 and 12 that even though the toggle points are in alignment relative to each other the contacts 28 and 33 remain closed. This tendency to hold the contacts in a closed position, even though the leaf spring 34 is at the point of moving to open them, is due to the construction which provides for either an initial tension being given thereto as described in connection with Fig. 9, or for an independent toggle mounting as shown in Figs. 11 to 14. With either arrangement there is provided a downwardly acting component of force which tends to hold the contacts closed, i. e., maintain contact pressure therebetween during the period of passing through dead center position and momentarily thereafter. Any further downward movement of arm 55, however, moves the pivot or toggle points 42, 43 and 44 out of the aligned position shown in Figs. 8 and 12. They then snap or toggle to the position shown in Figs. 9 and 13 and the leaf spring 34 is moved, i. e., pivoted about the fulcrum 50 and the contacts are opened with a snap action.

It will be apparent that the construction provided herein permits the device to operate so that relatively high contact pressure between the contacts 28 and 33 is maintained during the movement of the toggle members through dead center position. Figs. 7 to 14, inclusive, illustrate a cycle of operation and show how pressure is maintained to hold the contacts either open or closed at the dead center position.

From the above disclosure it will be apparent that there is provided a switch device having a positive spring action which assures high contact pressures and positive "make" and "break" of the contact points. There is thus provided a switch operation devoid of chattering and arcing. Another feature and advantage of this construction is the relatively large movement obtained between the switch or contact points.

The differential in bellows pressure between open and closing of the valve or contacts can be varied by adjusting the position of the screw 50 to change the vertical height of the fulcrum point for the link 40.

Figure 15:
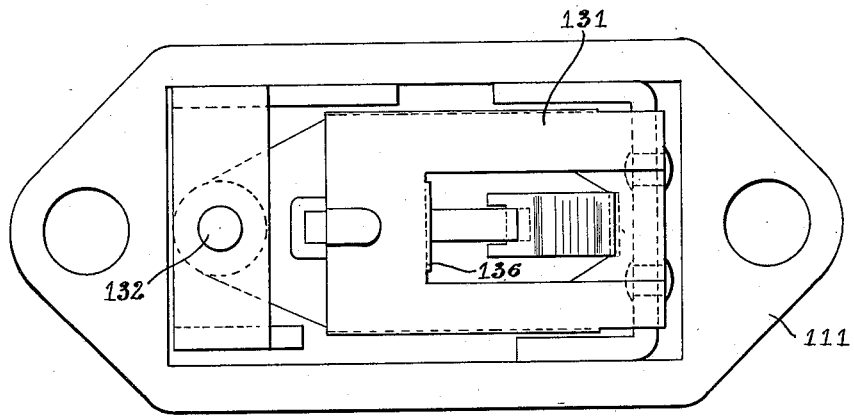
Fig. 15 is a top elevational view of the modified form of the device mounted in a plastic case and with the cover removed.
Figure 16:
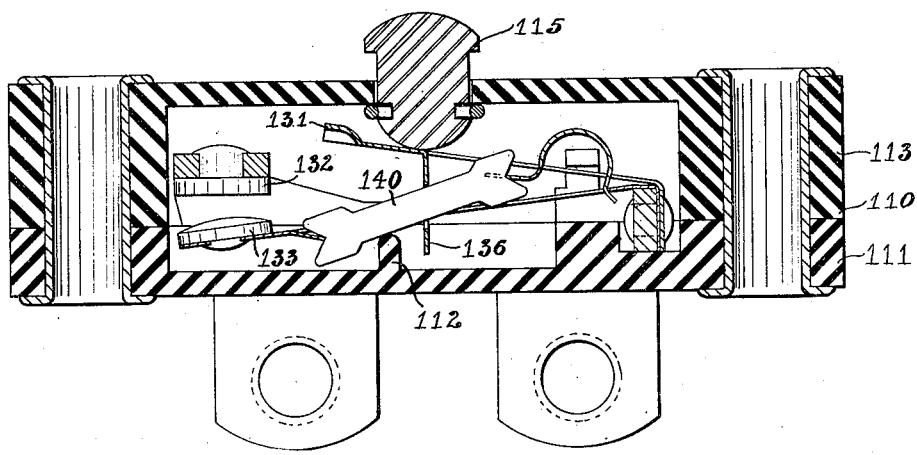
Fig. 16 is a side elevational view of the device illustrated in Fig. 15.

With reference to Figs. 15 and 16, a modified form of the present device is illustrated which is particularly adapted for very small or miniature size switches. In the construction shown there the toggle mechanism, springs, etc., are similar to those previously described. In this form however, the mechanism is mounted in a small plastic case 110 comprising the upper and lower members 111 and 113. Link or toggle member 140 is pivotally mounted, intermediate its ends on a fixed pivot member 112. A vertically reciprocable push-button 115 is adapted to be operated manually to move the switch spring 131 to effect a closing of the contacts 132 and 133. This spring is also provided with an initial tension which tends to hold the contact normally in the open position and force the push-button to the position shown when manual pressure is released. By depressing the push-button 115, the switch spring 131, together with its slotted arm 136, is moved sufficiently to pivot the toggle member 140 about the pivot point 112 to close the contacts with a snap action. Upon release of the push-button 115, the tension of spring 131 is sufficient to cause the contacts to separate with a snap action. The device illustrated is otherwise similar in operation to that previously described in connection with Fig. 1.

Although the above description is directed to a small, light weight and rugged electrical switch construction, it is to be understood that the principles involved are not limited to use in that type of device only. The features of the construction, such as the relatively large movement of the snap acting members in comparison with the relatively small movement of the actuating medium, together with the construction providing for a downward component of force tending to hold the contact members closed even though at the point of toggling to an open position, i. e., the maintaining of a high contact pressure before separation, are well adapted for use in a number of devices of other types and for other purposes.

While the forms of embodiments of the present invention as herein disclosed constitute preferred forms, it is to be understood that other forms might be adopted, all coming within the scope of the claims which follow.

I claim:

1. In a snap acting mechanism, a movable element adapted to be actuated with a snap movement; a support; mechanism for actuating the element including an inflexible, translatably movable link having one end pivotally connected directly with the element, spring means interposed between the other end of the link and the support, said support, element, link and spring means being arranged to have a dead center position; and means directly engaging the link for translatably shifting the link from one side of the dead center position through dead center position.

2. In a snap acting mechanism, a pair of cooperating members arranged to be opened and closed with respect to one another; a movable element adapted to be actuated with a snap movement and supporting one of the members; a support; mechanism for actuating the element to open and close the members including an inflexible translatably movable link having one end pivotally connected to the element, spring means pivotally engaging the other end of said link and with the support, said support, element, link and spring means being arranged to have a dead center position, said support, link and spring being positioned to apply pressure on said element to hold the members together when at said dead center position; and means for translatably shifting the mechanism from one side of the dead center position thereof through dead center position.

3. In a snap acting mechanism, a movable element adapted to be actuated with a snap movement; mechanism for actuating the element including an inflexible translatably movable link having one end pivotally connected with the element, spring means pivotally connected with the other end of the link and the element; and means for translatably shifting the position of the link relative to the element.

4. In a snap acting device, an element movable with snap action in either of two directions; a support; mechanism for actuating the element including a translatably movable link having one end connected to the element, spring means connected between the other end of the link and the support independent of the element; a guide member for the link; and means for applying pressure to the guide member to translatably move the link from one position to another.

5. A snap acting device comprising in combination, a leaf spring fulcrumed at one end to provide for movement thereof in two directions; a second spring; a translatably movable toggle member having one end pivotally engaging at the free end of said spring and having the other end pivotally engaging the second spring, the second spring being pivotally supported in a position to apply pressure to the toggle member during movement of the toggle member; a stop for said toggle member providing a fulcrum point for said member between its ends, said second spring and toggle member having a dead center position wherein their respective pivot points are aligned in substantially a straight line; an actuating member adapted, when moved in one direction, to translatably move the toggle member against said stop and upon continued movement in said direction cause the toggle member to fulcrum on said stop beyond said dead center position to provide for moving the leaf spring with a snap action.

6. A snap acting device comprising, in combination, a pair of cooperating members arranged to be opened and closed with respect to one another; means including an arm carrying one of said members and being biased to hold said members in closed position with respect to one another; mechanism for actuating the free end of the arm comprising a link having a pivotal connection at one end with the arm, a spring having a pivotal connection with the other end of the link, a pivotal connection for the other end of the spring; and means for moving one of said pivotal connections through a plane wherein the three pivotal connections are aligned, said first means biasing said arm to closed position of the members while the second means is operating to move said one pivotal connection through said plane.

7. In a snap acting mechanism, an arm adapted to be actuated with snap movement; mechanism for actuating the free end of the arm comprising a link having a pivotal connection at one end with the arm, a spring having a pivotal connection with the other end of the link on one side of the arm when the arm is in one position, a support having a pivotal connection with the other end of the spring on said side of the arm when the arm is in said one position, the three pivotal connections having a dead center position and said spring biasing the arm towards said one position of the arm while movement is being imparted to one of the pivotal connections toward and through dead center position of the pivotal connection; and means for moving said one pivotal connection from one side of dead center to the other, said means having a lost motion connection for free movement of the said one pivotal connection by the spring after movement thereof through dead center position.

8. In a snap acting mechanism, an arm adapted to be actuated with snap movement; mechanism for actuating the free end of the arm comprising a translatably movable link having a pivotal connection at one end with the arm, a spring having a pivotal connection with the other end of the link on one side of the arm when the arm is in one position, a support having a pivotal connection with the other end of the spring on said side of the arm when the arm is in said one position, the three pivotal connections having a dead center position and said spring biasing the arm towards said one position of the arm while movement is being imparted to the translatably movable link toward and through dead center position of the pivotal connection; and means for translatably moving said link from one side of dead center position to the other, said means having a lost motion connection for free movement of the link by the spring after movement thereof through dead center position.

ESTEL C. RANEY.

REFERENCES CITED

The following references are of record in the file of this patent:

UNITED STATES PATENTS

| Number | Name | Date |
| --- | --- | --- |
| 1,954,391 | Matson | Apr. 10, 1934 |
| 2,135,864 | Weber | Nov. 8, 1938 |
| 2,228,523 | Johnson | Jan. 14, 1941 |
| 2,330,506 | Matthias | Sept. 28, 1943 |
| 2,368,679 | Popp | Feb. 6, 1945 |
| 2,414,778 | Tratsch | Jan. 21, 1947 |
| 2,417,652 | Kunzler | Mar. 18, 1947 |
| 2,425,159 | Meyer | Aug. 5, 1947 |
| 2,429,069 | Murray | Oct. 14, 1947 |
| 2,439,747 | Nelson | Apr. 13, 1948 |
| 2,454,185 | Kmiecik | Nov. 16, 1948 |

FOREIGN PATENTS

| Number | Country | Date |
| --- | --- | --- |
| 551,021 | Great Britain | Feb. 4, 1943 |